(12) United States Patent
Tian et al.

(10) Patent No.: US 12,221,096 B2
(45) Date of Patent: *Feb. 11, 2025

(54) BASELINING AUTONOMOUS VEHICLE SAFETY USING DRIVING DATA OF HUMAN AUTONOMOUS VEHICLE OPERATORS

(71) Applicant: GM Cruise Holdings LLC, San Francisco, CA (US)

(72) Inventors: Feng Tian, Foster City, CA (US); Seunghyun Min, Oakland, CA (US); Laura Athena Freeman, Golde, CO (US); Lei Huang, San Jose, CA (US); Daniel Tien, San Francisco, CA (US); Geoffrey Louis Chi-Johnston, San Francisco, CA (US); Christopher Brian Roland, Santa Monica, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 17/733,230

(22) Filed: Apr. 29, 2022

(65) Prior Publication Data

US 2023/0347882 A1 Nov. 2, 2023

(51) Int. Cl.
*B60W 30/095* (2012.01)
*B60W 40/04* (2006.01)
(Continued)

(52) U.S. Cl.
CPC ........ *B60W 30/0956* (2013.01); *B60W 40/04* (2013.01); *B60W 50/0097* (2013.01); *B60W 60/0011* (2020.02); *B60W 60/0015* (2020.02); *B60W 60/00274* (2020.02); *G06N 3/04* (2013.01); *B60W 2554/402* (2020.02); *B60W 2554/4042* (2020.02); *B60W 2554/4043* (2020.02); *B60W 2554/4044* (2020.02);
(Continued)

(58) Field of Classification Search
None
See application file for complete search history.

(56) References Cited

U.S. PATENT DOCUMENTS 11,648,962 B1 * 5/2023 Crego ..................... G08G 1/166
701/26
11,858,536 B1 * 1/2024 Liu ....................... G06N 3/0464
(Continued)

FOREIGN PATENT DOCUMENTS

EP 3958181 A1 * 2/2022 ............. G06N 20/00
WO WO-2019174397 A1 * 9/2019 ............. B60W 30/08

OTHER PUBLICATIONS

Machine translation of WO-2019174397-A1 (Year: 2019).*

*Primary Examiner* — Hussein Elchanti
*Assistant Examiner* — Kenneth M Dunne
(74) *Attorney, Agent, or Firm* — Michael DiCato

(57) ABSTRACT

System, methods, and computer-readable media for configuring an autonomous vehicle based on safety scores determined by a safety score prediction algorithm, and an associated training technique, to output a safety score for a predicted and/or actual path. The safety score is a value indicating a likelihood of risky events per distance. The safety score prediction algorithm is trained with historical human driving datasets associated with paths (predicted or actual) taken by one or more AVs during human driving.

17 Claims, 6 Drawing Sheets

(51) Int. Cl.
*B60W 50/00* (2006.01)
*B60W 60/00* (2020.01)
*G06N 3/04* (2023.01)

(52) U.S. Cl.
CPC . *B60W 2554/4045* (2020.02); *B60W 2554/80* (2020.02); *B60W 2556/10* (2020.02)

(56) References Cited

U.S. PATENT DOCUMENTS

| | | | |
|---|---|---|---|
| 12,049,221 B2* | 7/2024 | Sun | G06N 3/045 |
| 2020/0174481 A1* | 6/2020 | Van Heukelom | G01C 21/3407 |
| 2020/0274894 A1* | 8/2020 | Argoeti | H04L 63/1433 |
| 2022/0068052 A1* | 3/2022 | Maeta | G07C 5/0808 |
| 2022/0188667 A1* | 6/2022 | Burisch | G08G 1/166 |
| 2023/0331252 A1* | 10/2023 | Tian | G01S 17/931 |
| 2023/0339519 A1* | 10/2023 | Chi-Johnston | B60W 50/0097 |

* cited by examiner

BASELINING AUTONOMOUS VEHICLE SAFETY USING DRIVING DATA OF HUMAN AUTONOMOUS VEHICLE OPERATORS

TECHNICAL FIELD

The subject technology pertains to configuring an autonomous vehicle based on safety scores determined by a safety score prediction algorithm.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
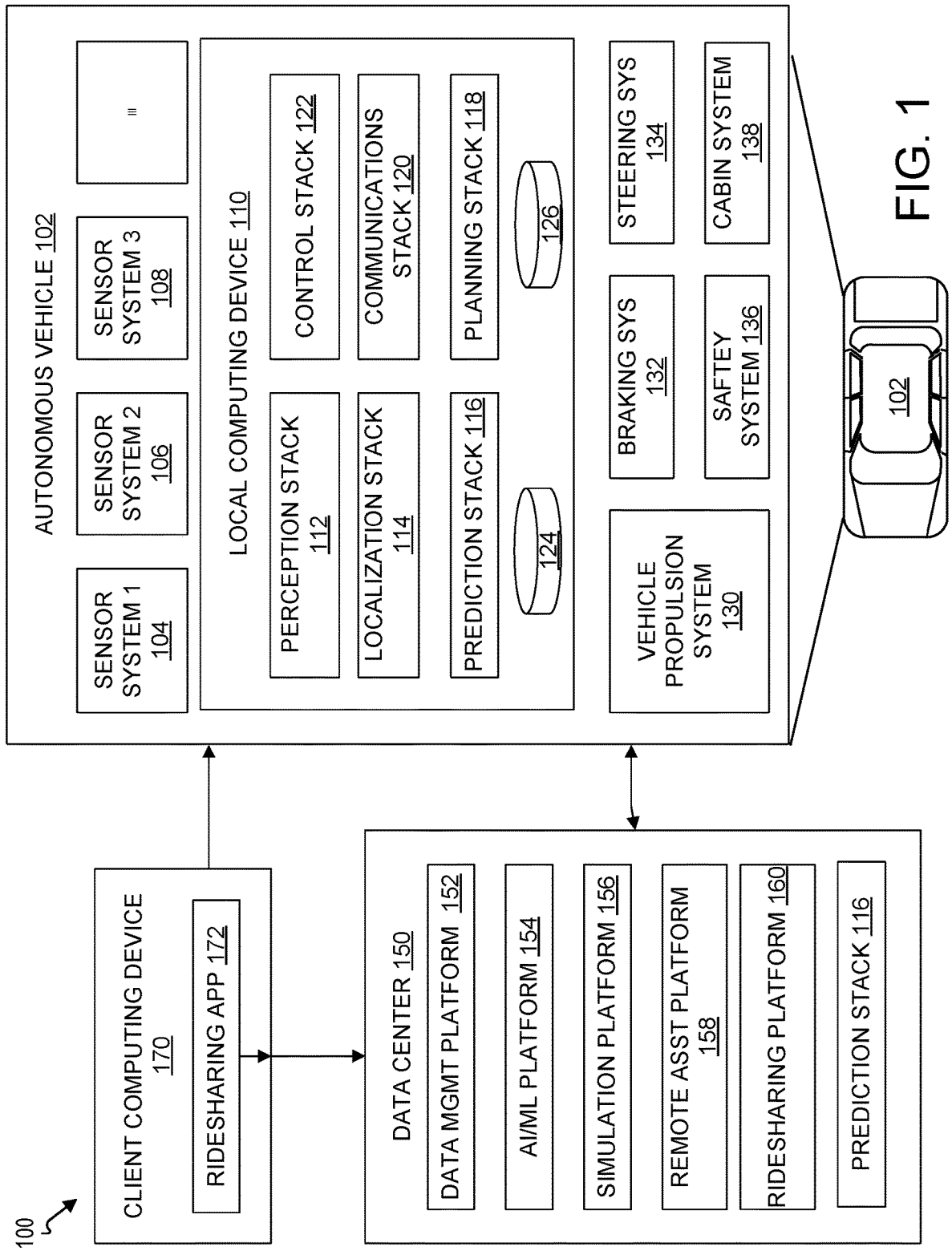
FIG. 1 shows an example of an autonomous vehicle system and supporting devices in accordance with some aspects of the present technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for calibrating a safety score prediction algorithm to better represent a real-world safety indicator for autonomous driving. In some examples, the disclosed technology can calibrate a safety score prediction algorithm by training the safety score prediction model with human driving datasets, including real historical collisions. The safety score prediction algorithm may receive kinematic and semantic environmental variables as inputs and output a safety score associated with the trajectory or path taken by the AV. The safety score may be based on a value scale with one end of the scale indicating that the decisions made by the AV were high in risk and/or likely to cause a collision (e.g., 1, high, etc), and on the other end of the scale, low or no risk in causing a collision (e.g., 0, low, etc). A term "collision" or "crash" is used herein to collectively include a collision and a near miss (i.e., near collision or near crash).

AV crash data used to train the safety score prediction algorithm may be based on simulated crashes. Therefore, validating the model without using human driving datasets means that the models might diverge from reality. By incorporating human driving datasets, including real historical collisions, a baseline is established against real probabilities in which the likelihood of a collision arises. The safety score prediction model trained by human driving data sets a realistic benchmark for validating the safety score prediction model. The human driving dataset is collected from driving performed by one or more users, such as AV technical operators (AVTOs), that take over the AV operation. The human driving dataset includes data pertaining to when the user (e.g., the AVTO) takes over the AV operation and when actual crashes occur.

In some examples, the present technology can train the safety score prediction model with training data. In some cases, the training data can include actual historical crashes or counterfactual collisions where the AVTO takes over before a collision actually occurs. The safety score prediction algorithm may determine a more continuous measure of on-road risk and predict that any event on the road could be considered a safety-critical event or potential crash. A safety-critical event is a crash or a "near-crash" event. A "near-crash" is an event that did not result in a crash but came within a threshold of a crash or object in terms of factors such as timing, distance and/or proximity, speed, acceleration/deceleration, braking speed, stopping distance, etc.

The present technology can include determining safety scores of paths using the trained safety score prediction algorithm. The trained safety score prediction algorithm may receive kinematic and semantic environmental variables as perceived by sensors of the AV and a path taken by the AV. The trained safety score prediction algorithm may determine a safety score of the path based on the received information. The trained safety score prediction algorithm may further output the safety score of the path. The safety score may be a value indicating a likelihood of risky events per distance on the path. The safety score may be compared with other safety scores to evaluate the safety of the AV with respect to human drivers, between other metrics such as calendar times, times or day, and location.

The training techniques and safety score prediction model for an autonomous vehicle of the present technology solves at least these problems and provides other benefits as will be apparent from the figures and description provided herein.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., Lighting Detection and Ranging (LIDAR) systems, ambient light sensors, infrared sensors, etc.), Radio Detection and Ranging (RADAR) systems, Global Positioning System (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). The prediction stack 116 may also extend to the data center 150, whereby the various prediction models may be trained at the data center 150.

The mapping and localization stack 114 can determine the AV's position and orientation (pose) using different methods from multiple systems (e.g., GPS, IMUs, cameras, LIDAR, RADAR, ultrasonic sensors, the HD geospatial database, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
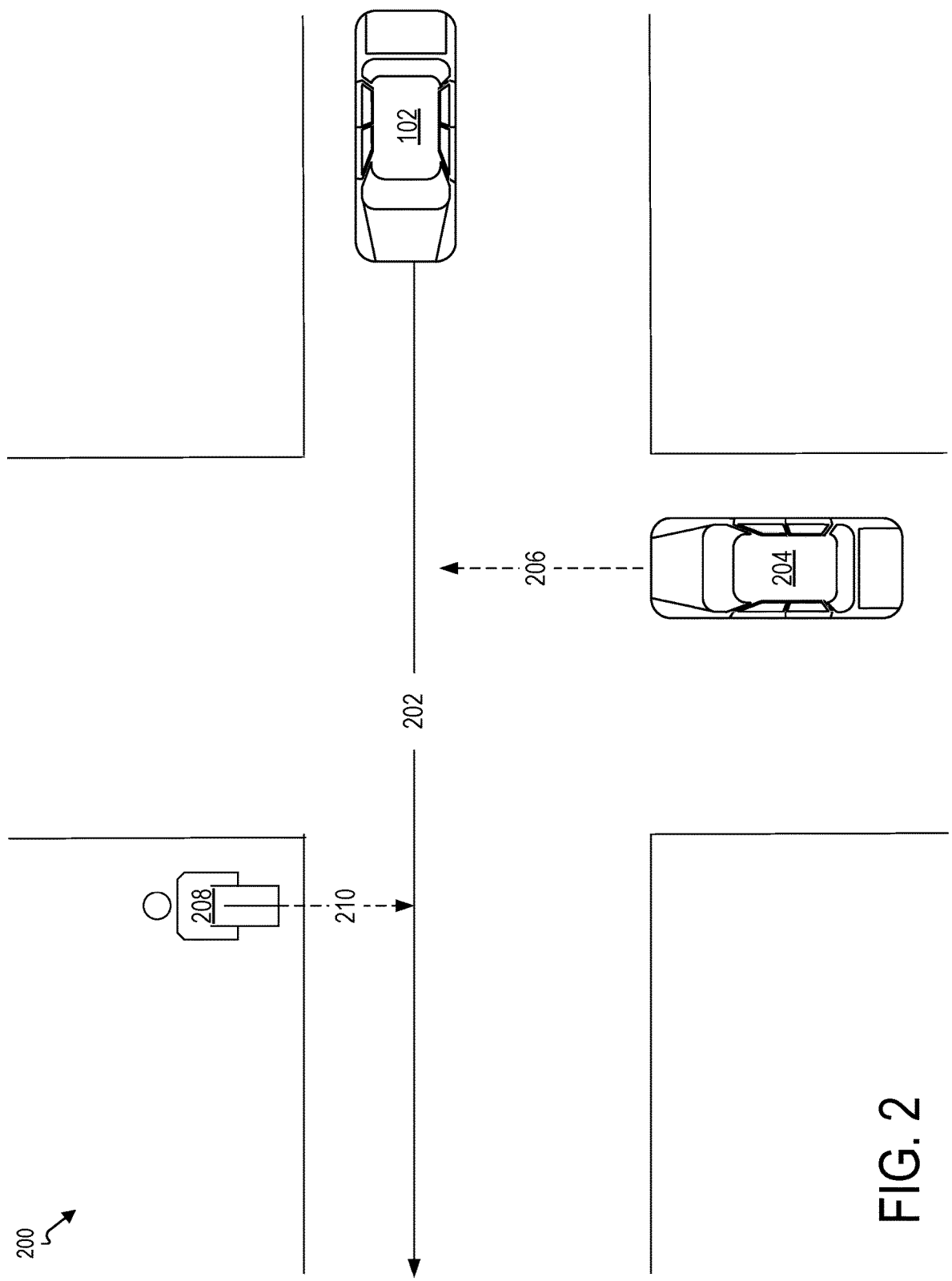
FIG. 2 shows an example environment, in which an autonomous vehicle detects nearby objects along a continuous path and the safety score is generated based on a continuous prediction of a safety score, in accordance with some aspects of the present technology.

FIG. 2 illustrates an example environment 200 for the autonomous vehicle, in which an autonomous vehicle detects nearby objects along a continuous path and the safety score is generated based on a continuous prediction of crash scores, in accordance with some aspects of the present technology.

In FIG. 2, the AV 102 decided to take an AV path 202, and the sensor systems 104, 106, 108 of the AV 102 collected data that includes a car 204 driving a first path 206 that is perpendicular to the AV path 202 and a pedestrian 208 walking a second path 210 also perpendicular to the AV path 202. To determine the safety score of the AV path 202 taken by the AV 102, based on determinations made at the prediction stack 116 and the planning stack 118, the safety score prediction algorithm of the AI/ML platform 154 may receive information pertaining to the nearby objects. In the illustrative example in FIG. 2, the information pertaining to nearby objects includes information about the car 204 and the pedestrian 208. The data collected may be converted into features that represent the characteristics of each object and the AV's response to each object. For example, features may include the type of object (e.g., car, pedestrian, bike, etc.), speed/acceleration of the object, deceleration required by the object to avoid a collision, the distance between the object and AV, AV acceleration at the time of minimum kinematic time-to-collision between the AV and object, etc. Each feature may be discretized into categories of the likelihood of collision (e.g., low, medium, high). Some features may be derived from physics models or statistical heuristics that come from an error analysis process for iterating the models.

Figure 3:
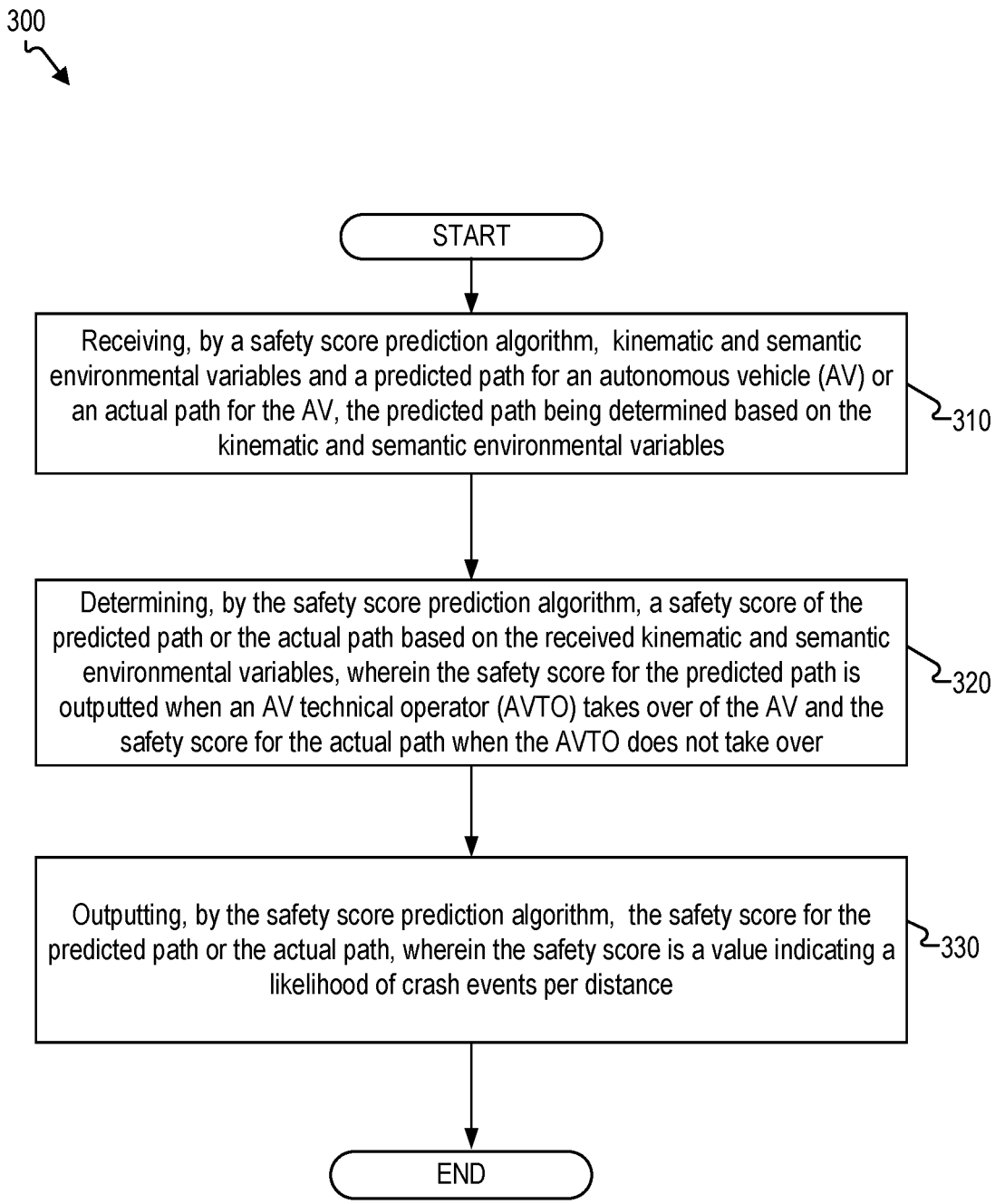
FIG. 3 shows an example flow diagram for determining a safety score of an autonomous vehicle based a trained safety score prediction algorithm, in accordance with some aspects of the present technology.

FIG. 3 shows an example method for determining a safety score of an autonomous vehicle based on a trained safety score prediction algorithm, in accordance with some aspects of the present technology. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some aspects, at block 310, the method 300 includes receiving, by a safety score prediction algorithm, kinematic and semantic environmental variables as perceived by sensors of an autonomous vehicle (AV) and a path taken by the AV. For example, the safety score prediction algorithm of the AL/ML platform 154 illustrated in FIG. 1 may receive kinematic and semantic environmental variables as perceived by sensors of the AV and a path taken by the AV. The kinematic and semantic environmental variables may be characterized by and/or generated into features.

According to some aspects, at block 320, the method 300 includes determining, by the safety score prediction algorithm, a safety score of the trajectory based on the received information (e.g., the kinematic and semantic environmental variables and the path taken by the AV). For example, the safety score prediction algorithm of the AL/ML platform 154 illustrated in FIG. 1 may determine a safety score of the trajectory based on the received information.

More specifically, the safety score prediction algorithm may determine the safety score by predicting a probability of collision over each segment of the predicted path. In some examples, the method 400 can include aggregating the probabilities of collection over the various segments of the predicted path to generate an overall safety score. For example, the safety score prediction algorithm of the AL/ML platform 154 illustrated in FIG. 1 may predict a probability of collision over each segment of the predicted path. In some aspects, the method 300 may include aggregating the predicted probabilities to determine the safety score for the predicted path. For example, the safety score prediction algorithm of the AL/ML platform 154 illustrated in FIG. 1 may aggregate the predicted probabilities to determine the safety score for the predicted path. In some cases, taking an accumulation of probabilities of collision over a segment in a same geographical location by a plurality of vehicles may provide information about where and when it may be more dangerous in a city.

In some aspects, the safety score prediction algorithm may determine the safety score by converting the received kinematic and semantic environmental variables into features that represent respective nearby objects. In some examples, the safety score can be determined at least partly based on the features. For example, the safety score prediction algorithm of the AL/ML platform 154 illustrated in FIG. 1 may convert the received kinematic and semantic environmental variables into features that represent respective nearby objects, wherein the safety score is determined based on the features. A distribution of historical kinematic and semantic environmental variables may be generated for each feature and a number of buckets created based on the distribution to classify the feature. For example, the buckets may be classified into a number of buckets (e.g., low, medium, and high likelihood of collision buckets). The buckets are used so that the safety score prediction algorithm is not overtrained.

The safety score prediction algorithm may be trained to learn which feature values contribute most to predicting which on-road events lead to a safety-critical event. Such features being, for example, the speed and acceleration of the AV, the speed and acceleration of the other objects, the distance between the AV and other objects, the kinematic time-to-collision of the AV with other objects, the types of other objects (e.g. vehicles, pedestrians, etc.), the extent to which the AV is aware of other objects in the scene (e.g. whether objects are visible or occluded), the extent to which other objects in the scene are aware of the AV, and whether the AV and/or other objects are signaling and/or otherwise conveying a driving behavior intent (e.g. via turn signals, honking, engaging flashers/sirens), etc.

As one example of a feature bucketization, consider a feature representing the time when an AV technical operator (AVTO) takes over control of the AV from the AV software. This time can be indexed from when a simulated collision would have occurred, such that a takeover 2 seconds before a simulated collision would have a feature value of −2 seconds, a takeover that occurs 1 second before a collision would have a feature value of −1 second, a takeover that occurs 1 second after a collision would have a feature value of 1 second, and so on. For context, when the AV is driving autonomously, an AVTO may take over when the AVTO finds the AV's trajectory to be risky. The simulated collision may be determined by reviewing the planned path generated by the planning stack 118 of the AV. The feature could also be calculated in terms of a distance: in some cases, the takeover may have occurred only a couple of feet before a collision may have occurred, and in other cases, it may have occurred a longer distance away from the potential collision determined through simulation. Once this feature is so calculated, an empirical distribution of times and/or distances can be generated from many segments of historical driving data and/or this feature can be modeled with a probability distribution (for example, say a Normal distribution with an estimated mean and variance). The feature values can then be categorized into discrete categories based on the position of those values within the larger distribution, such as classifying all values below/above a given percentile and/or standard deviations from the mean as low/medium/high, etc. As such, the distribution of historical kinematic and semantic environmental variables may be used as references for the classification of the buckets and determining a different quantifiable range for each bucket.

According to some aspects, at block 330, the method 300 includes outputting, from the safety score prediction algorithm, the safety score for the path. For example, the safety score prediction algorithm of the AL/ML platform 154 illustrated in FIG. 1 may output the safety score for the path. In some aspects, the safety score is a value indicating a likelihood of crash events per distance. In some examples, the safety score prediction algorithm is trained with historical human driving datasets associated with paths taken by one or more AVs during human driving.

In some aspects, the safety score is based on a continuous scale between two or more values and/or numbers. In some examples, the continuous scale correlates to a continuous likelihood of collision. In some aspects, the kinematic and semantic environmental variables include and/or indicate a type of object(s), a speed of the object(s) and/or the AV, an acceleration of the object(s) and/or the AV, and/or a distance between the object(s) and the AV. The kinematic and semantic environmental variables may further include a kinematic time-to-collision that measures how far away the AV is from a collision if all objects and the AV continue on their current trajectories.

The kinematic and semantic environmental variables are used as inputs to determine likelihood of crashing through the course of a path. In some cases, the kinematic and semantic environmental variables can include and/or indicate other information and/or features such as, for example and without limitation, traffic information, weather information, crash data (e.g., crash time, location, object associated with the crash, driving conditions during the crash, path of the AV during the crash, configuration of the road or environment at the location of the crash, etc.), operations and/or a behavior of the AV, etc.

Figure 4:
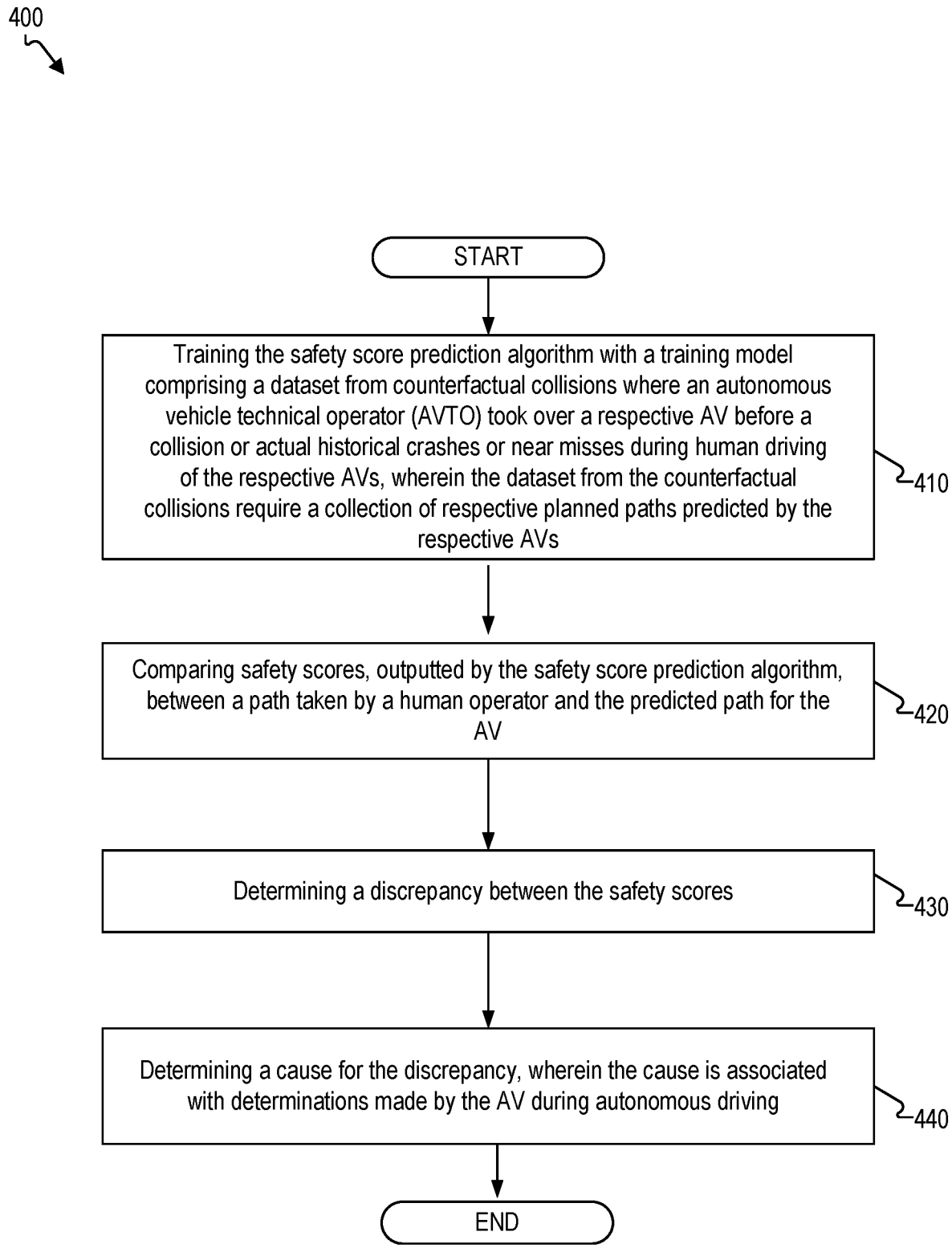
FIG. 4 shows an example flow diagram of training a machine-learning model to determine safety scores and comparing the safety scores between a path taken by a human operator and by an AV, in accordance with some aspects of the present technology.

FIG. 4 shows an example method of training a machine-learning algorithm to determine safety scores in accordance with some aspects of the present technology. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some aspects, at block 410, the method 400 includes providing the safety score prediction algorithm with a training model. For example, the AI/ML platform 154 may train a safety score prediction model, resulting in a "training model" aka a "trained model". In one example of training the safety score prediction model, on-road data is categorized into two types: "target" data, also known as the "Y" variable; and "predictor" data, also known as the "X" variable.

The actual historical crashes and "near misses" can be target data. The target data could also include counterfactual collisions (and counterfactual "near misses") where the AVTO takes over before a collision occurs and a planned path of the AV is projected forward to generate a simulated collision. For example, in a binary (0/1) encoding of the target variable, if a given segment of on-road driving includes a crash and/or near miss and/or "projected" crash, the "Y" variable could be coded as a "1" for this segment; if a given segment does not include a crash and/or near miss and/or "projected" crash, the "Y" variable could be coded as a "0" for this segment.

The predictor data (also known as the "X" variable) may include the feature values. For example, if a given segment has a minimum kinematic time-to-collision of 0.5 seconds between the AV and another object, and the speed of the other object is 2.0 meters/sec at the time of minimum kinematic time-to-collision, and the acceleration of the other object is 0.3 meters/sec^2, then the "X" variable for that segment might include the set of values {0.5, 2.0, 0.3}.

The safety score prediction model may learn to optimally predict the target ("Y") values using the predictor ("X") values. For example, the safety score prediction model may learn the optimal weights of a function f( ) that maps X to Y. For example, in a "logistic regression" machine learning (ML) model, the probability of an event being labeled as 0 or 1 (i.e. $p(y=1)$) is defined as $p=f(x)=1/(1+\exp(-x*\beta))$, where x are the predictor values for that event and beta are the set of feature weights learned from model training.

Function optimality (i.e. learning the optimal f( ) that maps X to Y) is determined by minimizing a "loss function" sometimes also called an "error function". In other words, the model tries to minimize the error between its predictions and the target or "Y" variable. The general loss function that is minimized by the logistic regression is known as the log-loss function: $LL=-(y*\log(p)\pm(1-y)*\log(1-p))$, where y is the SCE label of the segment, and p is the probability of SCE as assigned by the model. The safety score prediction algorithm may be "regularized" such that the loss function is different from a general loss function. Specifically, the safety score prediction algorithm may add a "penalty term" to the magnitudes of feature weights to reduce the tendency to overlearn from specific examples in the training data.

A safety score prediction model may learn which feature weights minimize the loss by a process called "gradient descent" which first measures the error of the predictions for a given set of feature weights, then measures how much a small change in the weights for each feature improves the errors, then makes a change to the weights that improves the errors, and then repeats the process until the model converges to an optimum.

Thus, the feature weights learned by the model identify which features are most correlated with on-road risk. That is, for scenarios with similar feature values, the model learns the likelihood that those scenarios resulted in a crash and/or near miss and/or "projected" crash.

In summary, the safety score prediction model could be trained on actual crashes to predict the rate/occurrence of projected/counterfactual crashes, or trained on projected/counterfactual crashes to predict the rate/occurrence actual crashes, or trained on both actual and projected/counterfactual crashes to predict both actual and projected/counterfactual crashes. Crashes are referred to as being "projected" or "counterfactual" if they were prevented from occurring by an AVTO taking over before the collision materialized, such that the collision needed to be predicted from what might have happened had the AVTO not taken over. As such, a model trained on projected/counterfactual collisions could be applied to predict the rate of actual crashes on human-operated vehicles (or vice-versa).

Note that if the safety score prediction algorithm was trained on counterfactual collision data, the safety score prediction algorithm could be validated by measuring how well it predicted the occurrence of actual collisions when applied to human/AVTO driving data.

In some examples, the safety proxy model can estimate the potential severity of a safety-critical event such as a given collision or a near miss. These severities can then be combined with the model-outputted safety risk and/or probability of collision to estimate a severity-weighted collision and/or near collision rate. For example, if the severity of an event A (SA) is scored as being twice the severity of an event B (SB), for example, because the probability of injury from the collision in event A is twice that of event B, and the risk and/or probability of safety-critical event A occurring is (PA) and the risk and/or probability of event B is (PB), then the severity-weighted risk of events A and B could be SA*PA+SB*PB. The severity scoring could include an injury risk component (based on, e.g., speeds and types of objects involved in the collision) as well as other business-related risks, such a reputational or legal factors. The estimated severity-weighted collision and/or near collision rate can be referred to as a dense "safety index" or DSI.

In the case of severity-weighted safety proxy models (i.e. "safety index" models) these models can be trained on actual severity-weighted crashes to predict the rate/occurrence of projected/counterfactual severity-weighted crashes, or trained on projected/counterfactual severity-weighted crashes to predict the rate/occurrence actual severity-weighted crashes, or trained on both actual and projected/counterfactual severity-weighted crashes to predict both actual and projected/counterfactual severity-weighted crashes.

If the "safety index" prediction algorithm was trained on counterfactual severity-weighted collision data, the "safety index" prediction algorithm could be validated by measuring how well it predicted the occurrence of actual severity-weighted collisions when applied to human/AVTO driving data.

The terms "safety proxy model", "safety proxy algorithm", "safety score model", and "safety score algorithm" are used herein to collectively refer to both non-severity-weighted models/algorithms as well as severity-weighted models/algorithms.

According to some aspects, at block 420, the method 400 includes comparing safety scores, outputted by the safety score prediction algorithm (e.g., the safety score prediction algorithm of the AL/ML platform 154), between a path taken by a human operator and the predicted path for the AV. For example, the safety score prediction algorithm can compare a safety score determined for a path taken by the human operator and a safety score determined for the predicted path of the AV. In some examples, the path taken by the human operator can be the same as the predicted path of the AV. In other examples, the path taken by the human operator can be a different path than the predicted path of the AV. For example, in some cases, the path taken by the human operator can be a different path that is determined to have one or more similarities to the predicted path of the AV. The one or more similarities can include, for example and without limitation, turning away from another vehicle or pedestrian early enough without needing to stop in order to avoid a collision, slowing down to allow another vehicle or pedestrian complete their intended path while avoiding needing to come to a sudden stop and/or any other similarities.

According to some aspects, at block 430, the method 400 includes determining a discrepancy between the safety scores. For example, the safety score prediction algorithm of the AL/ML platform 154 illustrated in FIG. 1 may determine a discrepancy between the safety scores. For example, the discrepancy may be that the AV decided to drive at a same speed in a scenario where there was an offset but close oncoming vehicle resulting in a lower score than a human driving a similar path. The human decided to drive further away from the offset but close oncoming vehicle, resulting in a higher score.

According to some aspects, at step 440, the method 400 includes determining a cause for the discrepancy. In some examples, the cause can be associated with determinations made at a prediction stack or a planning stack in step 440. For example, the safety score prediction algorithm of the AL/ML platform 154 illustrated in FIG. 1 may determine a cause for the discrepancy. To follow the previous example, the cause may be that the prediction stack or planning stack was not taking the potential closeness of the oncoming vehicle into account when determining its planned path. Therefore, the discrepancy of the safety score is able to provide insight as to what factors the prediction stack or planning stack is failing to consider or is considering inaccurately.

Figure 5:
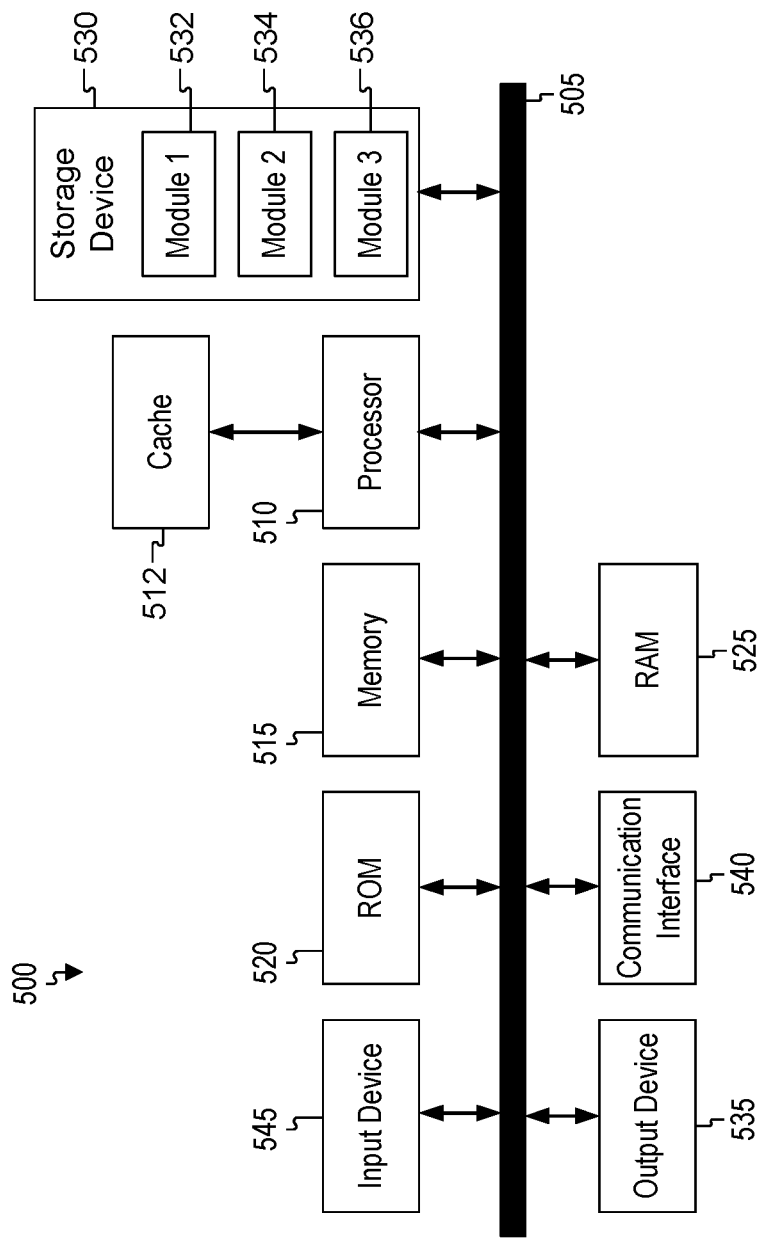
FIG. 5 shows an example system for implementing certain aspects of the present technology.

FIG. 5 shows an example of computing system 500, which can be for example any computing device making up the local computing device 110 and the data center 150, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Figure 6:
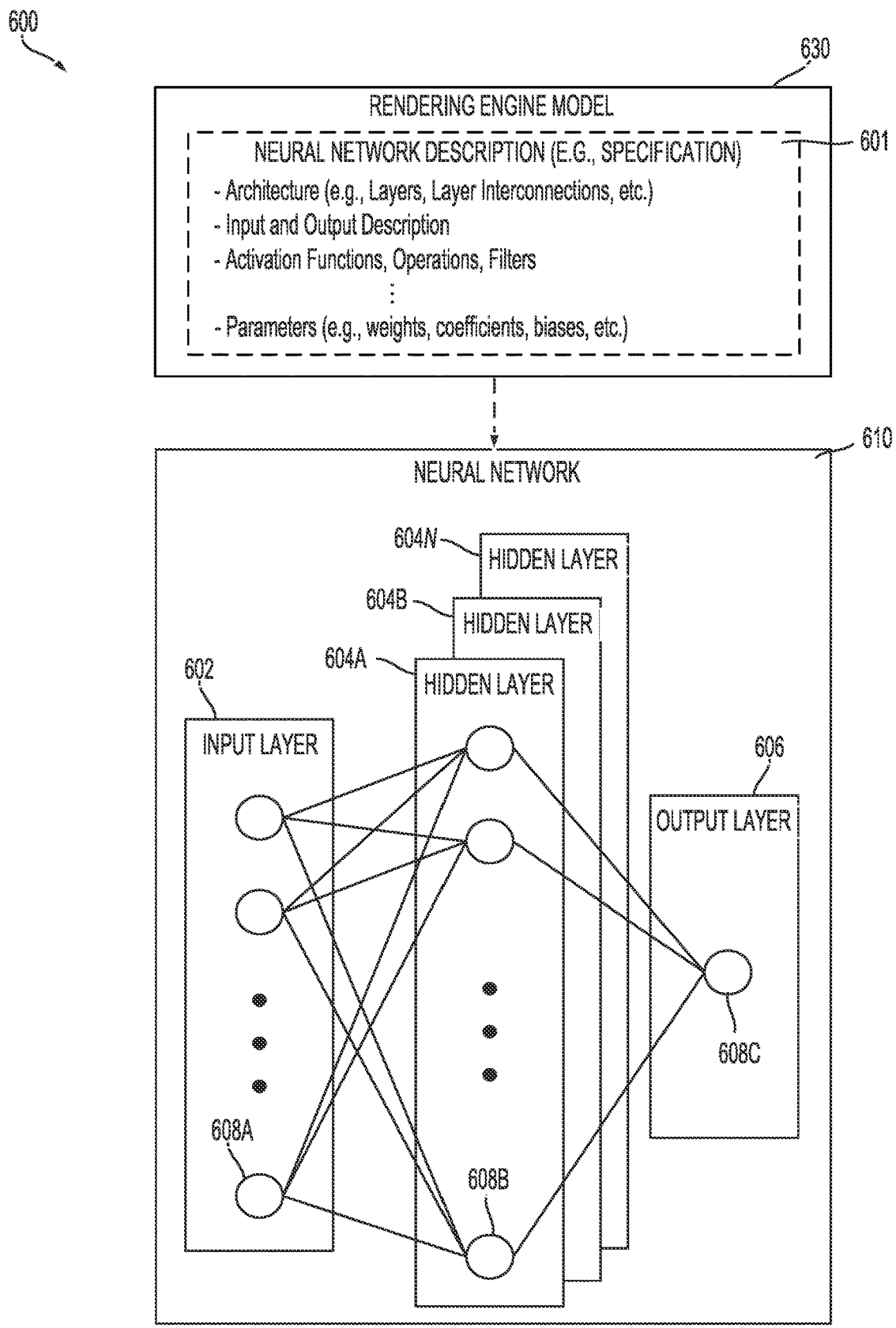
FIG. 6 illustrates an example neural network architecture in accordance with some aspects of the present technology.

FIG. 6 illustrates an example neural network architecture, in accordance with some aspects of the present technology. Architecture 600 includes a neural network 610 defined by an example neural network description 601 in rendering engine model (neural controller) 630. The neural network 610 can represent a neural network implementation of a rendering engine for rendering media data. The neural network description 601 can include a full specification of the neural network 610, including the neural network architecture 600. For example, the neural network description 601 can include a description or specification of the architecture 600 of the neural network 610 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 610 reflects the architecture 600 defined in the neural network description 601. In this example, the neural network 610 includes an input layer 602, which includes input data, information about objects (e.g., AV 102) in an environment as perceived by sensors 104, 106, 108 of the AV 102. In one illustrative example, the input layer 602 can include data representing a portion of the input media data such as a patch of data or pixels (e.g., a 128×128 patch of data) in an image corresponding to the input media data (e.g., that of AV 102 and the environment).

The neural network 610 includes hidden layers 604A through 604N (collectively "604" hereinafter). The hidden layers 604 can include n number of hidden layers, where n is an integer greater than or equal to one. The number of hidden layers can include as many layers as needed for a desired processing outcome and/or rendering intent. The neural network 610 further includes an output layer 606 that provides an output (e.g., paths that are outputted to a trained planning algorithm) resulting from the processing performed by the hidden layers 604. In one illustrative example, the output layer 606 can provide paths that are most likely to occur and a path that is considered an object collision path.

The neural network 610 in this example is a multi-layer neural network of interconnected nodes. Each node can represent a piece of information. Information associated with the nodes is shared among the different layers and each layer retains information as information is processed. In some cases, the neural network 610 can include a feed-forward neural network, in which case there are no feedback connections where outputs of the neural network are fed back into itself. In other cases, the neural network 610 can include a recurrent neural network, which can have loops that allow information to be carried across nodes while reading in input.

Information can be exchanged between nodes through node-to-node interconnections between the various layers. Nodes of the input layer 602 can activate a set of nodes in the first hidden layer 604A. For example, as shown, each of the input nodes of the input layer 602 is connected to each of the nodes of the first hidden layer 604A. The nodes of the hidden layer 604A can transform the information of each input node by applying activation functions to the information. The information derived from the transformation can then be passed to and can activate the nodes of the next hidden layer (e.g., 604B), which can perform their own designated functions. Example functions include convolutional, up-sampling, data transformation, pooling, and/or any other suitable functions. The output of the hidden layer (e.g., 604B) can then activate nodes of the next hidden layer (e.g., 604N), and so on. The output of the last hidden layer can activate one or more nodes of the output layer 606, at which point an output is provided. In some cases, while nodes (e.g., nodes 608A, 608B, 608C) in the neural network 610 are shown as having multiple output lines, a node has a single output and all lines shown as being output from a node represent the same output value.

In some cases, each node or interconnection between nodes can have a weight that is a set of parameters derived from training the neural network 610. For example, an interconnection between nodes can represent a piece of information learned about the interconnected nodes. The interconnection can have a numeric weight that can be tuned (e.g., based on a training dataset), allowing the neural network 610 to be adaptive to inputs and able to learn as more data is processed.

The neural network 610 can be pre-trained to process the features from the data in the input layer 602 using the different hidden layers 604 in order to provide the output through the output layer 606. In an example in which the neural network 610 is used to identify an object collision path from a trained object path prediction algorithm, the neural network 610 can be trained using training data that includes example objects (e.g., AV 102) in an environment as perceived by sensors 104-108 of the AV 102. For instance, training images can be input into the neural network 610, which can be processed by the neural network 610 to generate outputs which can be used to tune one or more aspects of the neural network 610, such as weights, biases, etc.

In some cases, the neural network 610 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 610, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 610 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 610 can perform a backward pass by determining which inputs (weights) most contributed to the loss of the neural network 610, and can adjust the weights so that the loss decreases and is eventually minimized.

A derivative of the loss with respect to the weights can be computed to determine the weights that contributed most to the loss of the neural network 610. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 610 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 610 can represent any other neural or deep learning network, such as an autoencoder, a deep belief nets (DBNs), a recurrent neural networks (RNNs), etc.

Illustrative examples of the disclosure include:

Aspect 1. A computer-implemented method comprising: receiving, by a safety score prediction algorithm, kinematic and semantic environmental variables and a predicted path for an autonomous vehicle (AV) or an actual path for the AV, the predicted path being determined based on the kinematic and semantic environmental variables; determining, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over; and outputting, by the safety score prediction algorithm, the safety score for the predicted path or the actual path, wherein the safety score is a value indicating a likelihood of crash events per distance.

Aspect 2. The computer-implemented method of Aspect 1, further comprising: converting the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

Aspect 3. The computer-implemented method of any of Aspects 1 to 2, wherein distribution of historical kinematic and semantic environmental variables are used as references for categorizing each feature into buckets including different quantifiable ranges.

Aspect 4. The computer-implemented method of any of Aspects 1 to 3, further comprising: training the safety score prediction algorithm with a training model comprising a dataset from counterfactual collisions where an AVTO took over a respective AV before a collision or actual historical crashes or near misses during human driving of the respective AVs, wherein the dataset from the counterfactual collisions require a collection of respective planned paths predicted by the respective AVs.

Aspect 5. The computer-implemented method of any of Aspects 1 to 4, further comprising: comparing safety scores, outputted by the safety score prediction algorithm, between a path taken by a human operator and the predicted path for the AV; determining a discrepancy between the safety scores; and determining a cause for the discrepancy, wherein the cause is associated with determinations made by the AV during autonomous driving.

Aspect 6. The computer-implemented method of any of Aspects 1 to 5, further comprising: predicting, by the safety score prediction algorithm, a probability of collision over each segment of the predicted path or the actual path; and aggregating, by the safety score prediction algorithm, the predicted probability of collision over each segment to yield an aggregated probability, wherein the safety score for the predicted path is based on the aggregated probability.

Aspect 7. The computer-implemented method of any of Aspects 1 to 6, wherein the safety score is based on a continuous scale between two numbers, wherein the continuous scale correlates to a continuous likelihood of collision and/or near collision.

Aspect 8. The computer-implemented method of any of Aspects 1 to 7, wherein the kinematic and semantic environmental variables include at least one of a type of an object, speed, acceleration, a distance between the object and the AV, a kinematic time-to-collision of the AV with other objects, an extent to which the AV is aware of the other objects, an extent to which the other objects are aware of the AV, and whether the AV and/or the other objects are signaling and a driving behavior intent conveyed by the signaling from each object. The kinematic and semantic environmental variables can further include (either singly and/or in combination) a kinematic time-to-collision between the AV and the at least one object; a deceleration required by the at least one object to avoid a collision with the AV, starting from a point of time in a window around the take over; a deceleration required by the AV to avoid a collision with the at least one object, starting from a point of time in a window around the take over; a "longitudinal correction" feature, i.e., the difference between the actual travel distance of the AV and the AV's planned path distance over the same period of time in a window of time around the take over; a type of the at least one object (e.g. pedestrian, cyclist, motor vehicle, etc.); a distance between the AV and the at least one object in a window of time around the take over; a "TKO distance time", i.e., an amount of time that has passed from a point of time in a window around the take over to the point at which the distance between the at least one object and the AV is at a minimum; a "TKO kinematic time-to-collision", i.e. an amount of time that has passed from a point of time in a window around the take over to the point at which a kinematic time-to-collision between the at least one object and the AV is at a minimum; a number of lidar points within a given radius of the AV in a window of time around the take over; a speed of the AV and/or the at least one object in a window of time around the minimum kinematic time-to-collision; an acceleration of the AV and/or the at least one object in a window of time around the minimum kinematic time-to-collision; a "reactivity" of the AV and/or the at least one object, i.e., the extent to which the AV and/or the at least one object is aware of other objects or environmental features around the roadway (e.g. whether objects are visible or occluded) and is prepared to react to other objects or environmental features such as potential future changes to objects' trajectories in a window of time around the take over; an expression of driving intent by the AV and/or the at least one object, i.e., whether the AV and/or the at least one object are signaling and/or otherwise conveying a driving behavior intent (e.g. via turn signals, honking, engaging flashers/sirens, etc.) in a window of time around the take over; a relative yaw of the AV and the at least one other object in a window of time around the minimum kinematic time-to-collision; a relative location of the AV and the at least one other object, i.e., whether the at least one other object is in front of the AV, the rear of the AV, or the sides of the AV, in a window of time around the minimum kinematic time-to-collision.

Aspect 9. A system comprising: memory configured to store instructions; and one or more processors configured to execute the instructions to cause the one or more processors to: receive, by a safety score prediction algorithm, kinematic and semantic environmental variables and a predicted path for an autonomous vehicle (AV) or an actual path for the AV, the predicted path being determined based on the kinematic and semantic environmental variables; determine, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over; and output, by the safety score prediction algorithm, the safety score for the predicted path or the actual path, wherein the safety score is a value indicating a likelihood of crash events per distance.

Aspect 10. The system of Aspect 9, wherein the one or more processors is configured to execute the instructions to cause the one or more processors to: convert the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

Aspect 11. The system of any of Aspects 9 to 10, wherein the one or more processors is configured to execute the instructions to cause the one or more processors to: train the safety score prediction algorithm with a training model comprising a dataset from counterfactual collisions where an autonomous vehicle technical operator took over a respective autonomous vehicle before a collision or actual historical crashes or near misses during human driving of the respective autonomous vehicles, wherein the dataset from the counterfactual collisions require a collection of respective planned paths predicted by the respective AVs.

Aspect 12. The system of any of Aspects 9 to 11, wherein the one or more processors is configured to execute the instructions to cause the one or more processors to: compare safety scores, outputted by the safety score prediction algorithm, between a path taken by a human operator and the predicted path for the AV; determine a discrepancy between the safety scores; and determine a cause for the discrepancy, wherein the cause is associated with determinations made by the AV during autonomous driving.

Aspect 13. The system of any of Aspects 9 to 12, wherein the one or more processors is configured to execute the instructions to cause the one or more processors to: predict, by the safety score prediction algorithm, a probability of collision over each segment of the predicted path or the actual path; and aggregate, by the safety score prediction algorithm, the predicted probability of collision over each segment to yield an aggregated probability, wherein the safety score for the predicted and/or actual path is based on the aggregated probability.

Aspect 14. The system of any of Aspects 9 to 13, wherein the safety score is based on a continuous scale between two numbers, wherein the continuous scale correlates to a continuous likelihood of collision.

Aspect 15. A non-transitory computer-readable medium comprising instructions, the instructions, when executed by a computing system, cause the computing system to: receive, by a safety score prediction algorithm, kinematic and semantic environmental variables and a predicted path for an autonomous vehicle (AV) or an actual path for the AV, the predicted path being determined based on the kinematic and semantic environmental variables; determine, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over; and output, by the safety score prediction algorithm, the safety score for the predicted path or the actual path, wherein the safety score is a value indicating a likelihood of crash events per distance.

Aspect 16. The non-transitory computer-readable medium of Aspect 15, wherein the non-transitory computer-readable medium further comprises instructions that, when executed by the computing system, cause the computing system to: convert the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

Aspect 17. The non-transitory computer-readable medium of any of Aspects 15 to 16, wherein the non-transitory computer-readable medium further comprises instructions that, when executed by the computing system, cause the computing system to: train the safety score prediction algorithm with a training model comprising a dataset from counterfactual collisions where the AVTO took over a respective AV before a collision or actual historical crashes or near misses during human driving of the respective AVs, wherein the dataset from the counterfactual collisions require a collection of respective planned paths predicted by the respective AVs.

Aspect 18. The non-transitory computer-readable medium of any of Aspects 15 to 17, wherein the non-transitory computer-readable medium further comprises instructions that, when executed by the computing system, cause the computing system to: compare safety scores, outputted by the safety score prediction algorithm, between a path taken by a human operator and the predicted path for the AV; determine a discrepancy between the safety scores; and determine a cause for the discrepancy, wherein the cause is associated with determinations made by the AV during autonomous driving.

Aspect 19. The non-transitory computer-readable medium of any of Aspects 15 to 18, wherein the non-transitory computer-readable medium further comprises instructions that, when executed by the computing system, cause the computing system to: predict, by the safety score prediction algorithm, a probability of collision over each segment of the predicted path or the actual path; and aggregate, by the safety score prediction algorithm, the predicted probability of collision over each segment to yield an aggregated probability, wherein the safety score for the predicted and/or the actual path is based on the aggregated probability.

Aspect 20. The non-transitory computer-readable medium of any of Aspects 15 to 19, wherein the safety score is based on a continuous scale between two numbers, wherein the continuous scale correlates to a continuous likelihood of collision.

What is claimed is:

1. A computer-implemented method comprising:
   receiving, by a safety score prediction algorithm, kinematic and semantic environmental variables and a predicted path for an autonomous vehicle (AV) or an actual path for the AV, the predicted path being determined based on the kinematic and semantic environmental variables;
   determining, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over;
   outputting, by the safety score prediction algorithm, the safety score for the predicted path or the actual path, wherein the safety score is a value indicating a likelihood of crash events per distance; and
   training the safety score prediction algorithm with a training model comprising a dataset from counterfactual collisions where an AVTO took over a respective AV before a collision or actual historical crashes or near misses during human driving of the respective AVs, wherein the dataset from the counterfactual collisions require a collection of respective planned paths predicted by the respective AVs.

2. The computer-implemented method of claim 1, further comprising:
   converting the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

3. The computer-implemented method of claim 2, wherein distributions of historical kinematic and semantic environmental variables are used as references for categorizing each feature into buckets including different quantifiable ranges.

4. The computer-implemented method of claim 1, further comprising:
   comparing safety scores, outputted by the safety score prediction algorithm, between a path taken by a human operator and the predicted path for the AV;
   determining a discrepancy between the safety scores; and
   determining a cause for the discrepancy, wherein the cause is associated with determinations made by the AV during autonomous driving.

5. The computer-implemented method of claim 1, further comprising:
   predicting, by the safety score prediction algorithm, a probability of collision over each segment of the predicted path or the actual path; and
   aggregating, by the safety score prediction algorithm, the predicted probability of collision over each segment to yield an aggregated probability, wherein the safety score for the predicted path and/or actual path is based on the aggregated probability.

6. The computer-implemented method of claim 1, wherein the safety score is based on a continuous scale between two numbers, wherein the continuous scale correlates to a continuous likelihood of collision.

7. The computer-implemented method of claim 1, wherein the kinematic and semantic environmental variables include at least one of a type of an object, speed, acceleration, a distance between the object and the AV, a kinematic time-to-collision of the AV with other objects, an extent to which the AV is aware of the other objects, an extent to which the other objects are aware of the AV, and whether the AV and/or the other objects are signaling and a driving behavior intent conveyed by the signaling from each object.

8. A system comprising:
   memory configured to store instructions; and
   one or more processors configured to execute the instructions to cause the one or more processors to:
   receive, by a safety score prediction algorithm, kinematic and semantic environmental variables and a predicted path for an autonomous vehicle (AV) or an actual path for the AV, the predicted path being determined based on the kinematic and semantic environmental variables;
   determine, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over;
   output, by the safety score prediction algorithm, the safety score for the predicted path or the actual path, wherein the safety score is a value indicating a likelihood of crash events per distance; and
   train the safety score prediction algorithm with a training model comprising a dataset from counterfactual collisions where an autonomous vehicle technical operator took over a respective autonomous vehicle before a collision or actual historical crashes or near misses during human driving of the respective autonomous vehicles, wherein the dataset from the counterfactual collisions require a collection of respective planned paths predicted by the respective AVs.

9. The system of claim 8, wherein the one or more processors is configured to execute the instructions to cause the one or more processors to:
   convert the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

10. The system of claim 8, wherein the one or more processors is configured to execute the instructions to cause the one or more processors to:
compare safety scores, outputted by the safety score prediction algorithm, between a path taken by a human operator and the predicted path for the AV;
determine a discrepancy between the safety scores; and
determine a cause for the discrepancy, wherein the cause is associated with determinations made by the AV during autonomous driving.

11. The system of claim 8, wherein the one or more processors is configured to execute the instructions to cause the one or more processors to:
predict, by the safety score prediction algorithm, a probability of collision over each segment of the predicted path or the actual path; and
aggregate, by the safety score prediction algorithm, the predicted probability of collision over each segment to yield an aggregated probability, wherein the safety score for the predicted and/or actual path is based on the aggregated probability.

12. The system of claim 8, wherein the safety score is based on a continuous scale between two numbers, wherein the continuous scale correlates to a continuous likelihood of collision.

13. A non-transitory computer-readable medium comprising instructions, the instructions, when executed by a computing system, cause the computing system to:
receive, by a safety score prediction algorithm, kinematic and semantic environmental variables and a predicted path for an autonomous vehicle (AV) or an actual path for the AV, the predicted path being determined based on the kinematic and semantic environmental variables;
determine, by the safety score prediction algorithm, a safety score of the predicted path or the actual path based on the received kinematic and semantic environmental variables, wherein the safety score for the predicted path is outputted when an AV technical operator (AVTO) takes over control of the AV and the safety score for the actual path when the AVTO does not take over;
output, by the safety score prediction algorithm, the safety score for the predicted path or the actual path, wherein the safety score is a value indicating a likelihood of crash events per distance; and
train the safety score prediction algorithm with a training model comprising a dataset from counterfactual collisions where the AVTO took over a respective AV before a collision or actual historical crashes or near misses during human driving of the respective AVs, wherein the dataset from the counterfactual collisions require a collection of respective planned paths predicted by the respective AVs.

14. The non-transitory computer-readable medium of claim 13, wherein the non-transitory computer-readable medium further comprises instructions that, when executed by the computing system, cause the computing system to:
convert the received kinematic and semantic environmental variables into features that represent kinematic and semantic environmental properties of the AV and other objects within a threshold proximity, wherein the safety score is determined based on the features, and wherein the safety score prediction algorithm is trained to learn which feature values contribute most to predicting which on-road events lead to a safety-critical event.

15. The non-transitory computer-readable medium of claim 13, wherein the non-transitory computer-readable medium further comprises instructions that, when executed by the computing system, cause the computing system to:
compare safety scores, outputted by the safety score prediction algorithm, between a path taken by a human operator and the predicted path for the AV;
determine a discrepancy between the safety scores; and
determine a cause for the discrepancy, wherein the cause is associated with determinations made by the AV during autonomous driving.

16. The non-transitory computer-readable medium of claim 13, wherein the non-transitory computer-readable medium further comprises instructions that, when executed by the computing system, cause the computing system to:
predict, by the safety score prediction algorithm, a probability of collision over each segment of the predicted path or the actual path; and
aggregate, by the safety score prediction algorithm, the predicted probability of collision over each segment to yield an aggregated probability, wherein the safety score for the predicted and/or the actual path is based on the aggregated probability.

17. The non-transitory computer-readable medium of claim 13, wherein the safety score is based on a continuous scale between two numbers, wherein the continuous scale correlates to a continuous likelihood of collision.

* * * * *